United States Patent
Rodzevski et al.

(10) Patent No.: US 9,479,672 B2
(45) Date of Patent: Oct. 25, 2016

(54) METHOD AND SYSTEM FOR EFFICIENT TRANSFER OF DIGITAL IMAGES CAPTURED BY A LIFELOG CAMERA

(71) Applicant: Sony Corporation, Tokyo (JP)

(72) Inventors: Alexandar Rodzevski, Malmo (SE); Hakan Jonsson, Hjarup (SE); Ola Thorn, Limhamn (SE)

(73) Assignee: Sony Mobile Communications Inc., Tokyo (JP)

( * ) Notice: Subject to any disclaimer, the term of this patent is extended or adjusted under 35 U.S.C. 154(b) by 36 days.

(21) Appl. No.: 14/462,915

(22) Filed: Aug. 19, 2014

(65) Prior Publication Data

US 2016/0021277 A1 Jan. 21, 2016

Related U.S. Application Data

(60) Provisional application No. 62/026,146, filed on Jul. 18, 2014.

(51) Int. Cl.
| | |
|---|---|
| *H04N 1/21* | (2006.01) |
| *H04N 9/82* | (2006.01) |
| *H04N 9/804* | (2006.01) |
| *H04N 5/77* | (2006.01) |
| *H04N 1/32* | (2006.01) |
| *H04N 5/225* | (2006.01) |
| *G06F 17/30* | (2006.01) |

(52) U.S. Cl.
CPC ........ *H04N 1/2166* (2013.01); *G06F 17/3028* (2013.01); *H04N 1/215* (2013.01); *H04N 1/32122* (2013.01); *H04N 5/225* (2013.01); *H04N 5/772* (2013.01); *H04N 9/8042* (2013.01); *H04N 9/8227* (2013.01); *H04N 2201/325* (2013.01); *H04N 2201/3226* (2013.01); *H04N 2201/3278* (2013.01)

(58) Field of Classification Search
None
See application file for complete search history.

(56) References Cited

U.S. PATENT DOCUMENTS

| | | | |
|---|---|---|---|
| 2004/0101178 A1 | 5/2004 | Fedorovskaya et al. | |
| 2005/0122430 A1 | 6/2005 | Lee et al. | |
| 2005/0219367 A1* | 10/2005 | Kanda | H04N 1/00209 348/207.2 |
| 2006/0112413 A1* | 5/2006 | Ando | H04N 5/77 725/105 |
| 2008/0192129 A1* | 8/2008 | Walker | G11B 27/034 348/231.2 |
| 2013/0215266 A1 | 8/2013 | Trundle et al. | |

OTHER PUBLICATIONS

International Search Report and Written Opinion dated Jul. 27, 2015 for corresponding International Application No. PCT/IB2015/053690.

* cited by examiner

*Primary Examiner* — Albert Cutler
(74) *Attorney, Agent, or Firm* — Renner, Otto, Boisselle & Sklar, LLP.

(57) ABSTRACT

A system and method of preparing images captured by a lifelog camera for efficient transfer from the camera to another device. The lifelog camera generates a corresponding thumbnail for each image that it captures, and an automated analysis engine analyzes the thumbnails for interestingness and, in some cases, for similarity.

14 Claims, 3 Drawing Sheets

METHOD AND SYSTEM FOR EFFICIENT TRANSFER OF DIGITAL IMAGES CAPTURED BY A LIFELOG CAMERA

RELATED APPLICATION DATA

This application claims the benefit of U.S. Provisional Patent Application No. 62/026,146, filed Jul. 18, 2014, the disclosure of which is incorporated herein by reference in its entirety.

TECHNICAL FIELD OF THE INVENTION

The technology of the present disclosure relates generally to lifelog cameras and, more particularly, to ways of efficiently transferring digital images captured by a lifelog camera.

BACKGROUND

A lifelog camera is a camera device that is typically worn by a user and used to capture photos that serve a photographic memory of events occurring near the user. Conventional lifelog cameras are configured to capture images on a timed basis. Some devices, for example, capture an image every 20 or 30 seconds. If left active to take pictures over the course of several hours or an entire day, the lifelog camera could capture hundreds or thousands of images. As might be expected, many of the images captured by a lifelog camera will have no or little future interest to the user.

Substantial and continuing gains in image capturing technology have resulted in corresponding gains in the quality of images being produced by digital cameras, including lifelog cameras. Higher quality images tend to result in larger image file sizes. Given the frequency with which images are captured by lifelog cameras, lifelog cameras are capable of generating multiple gigabytes of image data per period of use. In addition, lifelog cameras typically are designed merely to capture images and temporarily store them. It is typical that a lifelog camera is powered by a battery, has no display, and has electronic hardware that is more focused on low power consumption than on processing performance. Therefore, for a user to view images captured with a lifelog camera, the images are transferred to another device.

Transferring numerous images and/or images with large file sizes introduces inefficiencies in terms of bandwidth consumption and long transfer times. Moreover, the user will have a large collection of images, the vast majority of which are not interesting.

SUMMARY

The disclosed techniques enhance the efficiency of off-loading images from a lifelog camera and reduce the number of off-loaded images to a reasonable number of images. The techniques use thumbnail versions of the images to carry our image analysis. Thumbnails generated from high-resolution counterpart images are, by definition, of smaller size and contain less data than their high-resolution counterpart images. As a result, the thumbnail images are more efficiently transferred and/or may be analyzed as surrogates of the high-resolution images using less processing power. The results of the analysis on the thumbnail images may be applied to the corresponding high-resolution images. This makes it possible to analyze images on a lifelog camera or quickly transfer large numbers of thumbnail images to another device that is equipped with more powerful processing hardware than the lifelog camera to conduct analysis of the thumbnail images and return results to the lifelog camera.

According to one aspect of the disclosure, a lifelog camera that processes a collection of still images for efficient transfer to an external memory includes a camera module that captures still images according to an image capture routine of the lifelog camera; a memory in which the captured images are stored; and a control circuit configured to: generate a thumbnail image for each stored image, each thumbnail image stored in the memory at a resolution less than a resolution of the corresponding image; analyze the thumbnail images to identify one or more thumbnail images that meet transfer criteria; and tag for transfer the images that correspond to the thumbnail images that meet the transfer criteria.

According to one embodiment of the lifelog camera, the transfer criteria includes one or more of: the thumbnail image contains a face; the thumbnail image having gross-scale changes in image content relative to a thumbnail image for an image captured prior in time; and the thumbnail image not redundant of thumbnail images for images captured prior in time.

According to one aspect of the disclosure, a lifelog camera that processes a collection of still images for efficient transfer to an external memory includes a camera module that captures still images according to an image capture routine of the lifelog camera; a memory in which the captured images are stored; a control circuit configured to generate a thumbnail image for each stored image, each thumbnail image stored in the memory at a resolution less than a resolution of the corresponding image; and an interface to establish operative communication with another electronic device, wherein the control circuit controls the lifelog camera to transfer the thumbnail images stored by the memory to the another electronic device via the interface before transferring the images.

According to one embodiment of the lifelog camera, the lifelog camera receives data from the another electronic device over the interface, the data indicating a subset of the images to transfer to the external memory; and the control circuit controls the lifelog camera to transfer the subset of the images to the external memory.

According to one embodiment of the lifelog camera, the control circuit controls the lifelog camera to delete the stored images and each corresponding thumbnail image from the memory following the transfer of the subset of the images and without transferring images not in the subset.

According to one embodiment of the lifelog camera, the external memory is part of the another electronic device.

According to one embodiment of the lifelog camera, the external memory is part of an electronic device different than the another electronic device and the another electronic device generates the data as a service for the lifelog camera.

According to one embodiment of the lifelog camera, the data indicates the subset of the images to transfer by file identifiers corresponding to each image in the subset.

According to one embodiment of the lifelog camera, the data further indicates a group of images from the subset to compress with one another for transferring; and the control circuit compresses the images in the group prior to transferring.

According to one embodiment of the lifelog camera, relative to an order in which the collection of images was captured, the images in the group are separated in capture time by at least one other image from the collection.

According to one embodiment of the lifelog camera, the control circuit compresses the images in the group using an image in the group as an Iframe and another image in the group as a Pframe or a Bframe relative to the Iframe.

According to another aspect of the disclosure, a method of processing data related to a collection of images captured with a lifelog camera includes receiving from the lifelog camera a thumbnail image for each image in the collection of images without receiving the collection of images, each thumbnail image having a resolution lower than a resolution of the corresponding image; analyzing the thumbnail images in an automated analysis engine to identify a subset of the thumbnail images that meet criteria for preservation of the corresponding images with higher resolution; and transmitting to the lifelog camera identities of the images that correspond to the thumbnail images in the subset.

According to one embodiment of the method, the criteria are established to identify thumbnail images that correspond to images with visual interestingness, thumbnail images with visual interestingness included in the subset.

According to one embodiment of the method, the method includes comparing the thumbnail images in the subset to identify a group of images that have a threshold level of similarity for the lifelog camera to compress the group of images with one another for transferring to a memory external the lifelog camera, and the transmitting including identifying the images that are in the group.

According to one embodiment of the method, the criteria includes one or more of: less than a threshold angle between a main object in the thumbnail image and an optical axis of a camera module of the lifelog camera at a time that the corresponding image was captured; high image quality as defined by one or more of contrast, color balance, blur, focus, and depth of field; location of the lifelog camera at the time that the corresponding image was captured; presence of a face in the thumbnail image; presence of a recognized face in the thumbnail image; and presence of a predicted object type in the thumbnail image.

According to one embodiment of the method, the criteria is established to identify thumbnail images having gross-scale changes in image content relative to thumbnail images for images captured prior in time, thumbnail images having the gross-scale changes included in the subset.

According to one embodiment of the method, the criteria is established to identify thumbnail images having redundancy with thumbnail images for images captured prior in time, thumbnail images having redundancy excluded from the subset.

According to one embodiment of the method, the method includes identifying thumbnail images in the subset corresponding to images that are compressible with one another using one image as an Iframe and another image as a Pframe or a Bframe relative to the Iframe, the transmitting including identifying the images that are compressible with one another.

DETAILED DESCRIPTION OF EMBODIMENTS

Figure 1:
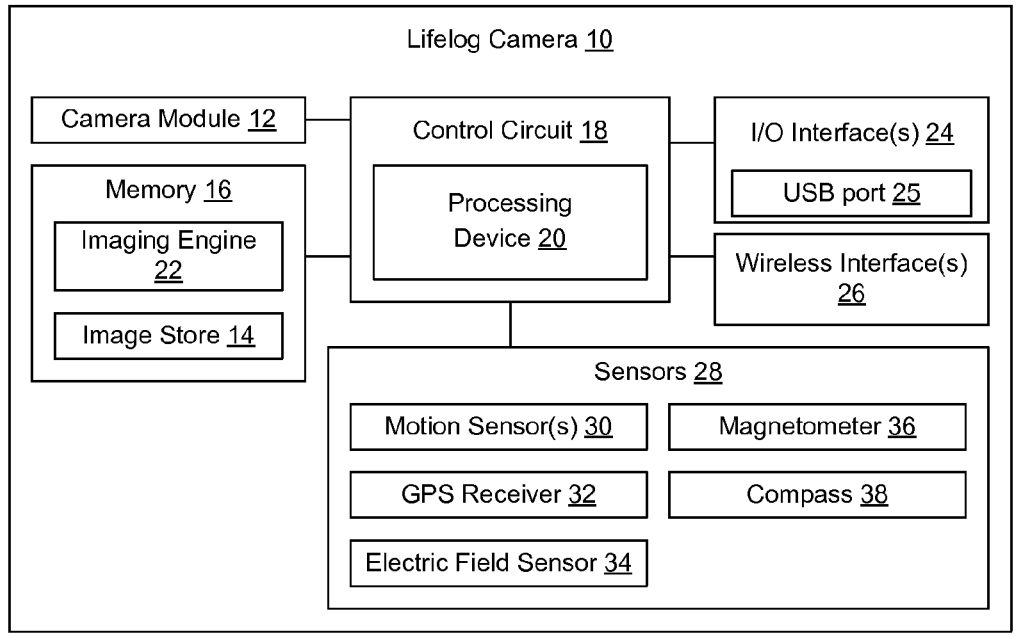
FIG. 1 is a schematic block diagram of a lifelog camera.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of an electronic device and a method of controlling the device in a way that allows for the efficient transferring of digital images from the device. In a representative embodiment, the electronic device is configured as a lifelog camera. In some embodiments, the lifelog camera interacts with another device, such as a computer, a server, or a mobile phone, that conducts image processing on behalf of the lifelog camera. Also, the other device, or a third device, may have a memory that is the target of image transfer following the image analysis. The described operations may be thought of as a method that is carried out by one or both of the lifelog camera and the another device.

The electronic device functioning as a lifelog camera is typically—but not necessarily—a dedicated lifelog camera. In other embodiments, the electronic device may be some other portable electronic device such as, but not limited to, a mobile telephone, a tablet computing device, a gaming device, a digital point-and-shoot camera, or a media player.

With initial reference to FIG. 1, illustrated is a schematic block diagram of an exemplary electronic device configured as a lifelog camera 10. The lifelog camera 10 may pin or clip to an article of clothing that the user wears. In other arrangements, the lifelog camera 10 is configured as a bracelet or wristband, a ring, a headband, eyeglasses, an article of clothing, a piercing, etc.

The lifelog camera 10 includes a camera module 12. The camera module 12 includes appropriate optics and a sensor for imaging a scene to generate still images and, in some cases, video. Although not illustrated, a microphone may be present to capture a sound component for the video. Images and video captured by the camera module 12 may be stored in an image store 14 of a memory 16. These images may be stored at a first resolution (also referred to as a native resolution), which is relatively high. The first resolution, however, may be lower than a resolution of the raw image data output from the camera module 12. Therefore, the terms "first resolution" and "native resolution" are used to describe the resolution of the images that are captured by the lifelog camera 10 and stored in the memory 16, which is a collection of still images.

The lifelog camera 10 includes a control circuit 18 that is responsible for overall operation of the lifelog camera 10, including controlling when to capture images with the camera module 12. In one embodiment, the control circuit 18 includes a processor 20 that executes operating instructions. In one embodiment, control over whether to capture and store an image is embodied as part of an imaging engine 22 that is also stored in memory 16. The imaging engine 22 may include an automated analysis engine (described below) that conducts post-processing analysis of the stored images and/or thumbnail images corresponding to the images. Also, the imaging analysis engine 22 may include an image management engine (also referred to as a compression engine) that manages the images, including compressing the images for transfer to an external memory.

The imaging engine 22 may be embodied in the form of an executable logic routine (e.g., lines of code, a software program, firmware, etc.) that is stored on a non-transitory computer readable medium (e.g., the memory 16) of the lifelog camera 10 and that is executed by the control circuit 18.

The processor 20 of the control circuit 18 may be a central processing unit (CPU), a microcontroller, or a microprocessor that executes code in order to carry out operation of the lifelog camera 10. The memory 16 may be, for example, one or more of a buffer, a flash memory, a hard drive, a removable media, a volatile memory, a non-volatile memory, a random access memory (RAM), or other suitable device. In a typical arrangement, the memory 16 includes a non-volatile memory for long-term data storage and a volatile memory that functions as system memory for the control circuit 18. The memory 16 may exchange data with the control circuit 18 over a data bus. Accompanying control lines and an address bus between the memory 16 and the control circuit 18 also may be present. The memory 16 is considered a non-transitory computer readable medium.

The lifelog camera 10 may include interfaces for establishing communication with another device, such as a computer, a mobile phone, a wireless router for establishing Internet access, etc. An exemplary interface is an input/output (I/O) interface 24 in the form of an electrical connector and interface circuitry for establishing connectivity to another device using a cable. A typical I/O interface 24 is a USB port 25. Operating power and/or power to charge a battery (not shown) of the lifelog camera 10 may be received over the I/O interface 24. The battery may supply power to operate the lifelog camera 10 in the absence of an external power source.

Another exemplary interface is a wireless interface 26. The wireless interface 26 may be, for example, an interface that operates in accordance with Bluetooth standards, WiFi standards, or another wireless standard. Another wireless interface 26 may be an intrapersonal area network, such as a body area network (BAN). Multiple wireless interfaces 26 may be present to operate over multiple standards (e.g., two or more of a BAN, Bluetooth and WiFi).

The lifelog camera 10 may include one or more sensors 28 that sense or determine various conditions related to the lifelog camera 10. In other embodiments (not shown), sensing components may be external to the lifelog camera, and may be in another device that communicates with the lifelog camera 10, such as a mobile phone carried by the user, or a bracelet worn by the user. The lifelog camera 10 may receive data from such external sensors over a wired or wireless interface. Examples of exemplary sensors include, but are not limited to, a motion sensor 30 (e.g., an accelerometer), a position data receiver (such as a global positioning system (GPS) receiver 32), an electric field sensor 34, a magnetometer 36, and a compass 38.

The lifelog camera 10 may be configured to capture images based on a number of different input criteria. In one embodiment, the lifelog camera may be configured to capture an image based on the input data received from one or more of the sensors 28. In another embodiment, the lifelog camera may be configured to capture images at a fixed time interval. In still another embodiment, the lifelog camera may be configured to capture images both at a fixed time interval and based on data received from one or more of the sensors. Additionally, the user may be able to prompt the camera to capture an image on command.

The lifelog camera 10 may include a display for displaying captured images and for assisting the user in adjusting settings. However, it is contemplated that the lifelog camera 10 will not include a display and images are viewed using a connected device or after transferring the images from the lifelog camera to another device.

Upon capturing an image, the imaging engine 22 may generate a corresponding thumbnail of the image. A thumbnail is a reduced-size and/or reduced-resolution version of its corresponding high-resolution image. The imaging engine 22 may store the thumbnail and the high-resolution image in the image store 14. In one embodiment, the thumbnail for each high-resolution image is created immediately after the corresponding high-resolution image is captured and stored, and the high-resolution image and the thumbnail are then stored in the image store 14. In another embodiment, each high-resolution image is stored immediately after being captured, and the corresponding thumbnail is generated at a later time. The later time may be a time when device resource utilization is low or when the lifelog camera 10 is interfaced with another electronic device in a manner that transferred or stored images is possible.

The imaging engine 22 may generate a record or log of, or otherwise manage, the relationship between the high-resolution image and its corresponding generated thumbnail. In one embodiment, the imaging engine 22 may record the relationship between the high-resolution image and the corresponding thumbnail in an index or other file. In an alternative embodiment, the imaging engine 22 may store the high-resolution image and its corresponding thumbnail in a two-dimensional array, where one dimension of the array contains an element for each image capture and where the corresponding dimension of the array contains both the high-resolution image and its corresponding generated thumbnail in respective elements. In yet another embodiment, the imaging engine 22 may assign similar file names, or similar metadata, to the high-resolution image and its corresponding thumbnail and may manage the relationship through recognition of this similarity. In another embodiment, the thumbnail may be metadata to the corresponding high-resolution image.

It is contemplated that the generated thumbnails will be analyzed as surrogates of the high-resolution images. As previously noted, analyzing the thumbnails, rather than the high-resolution images, allows for efficiency gains in several steps of the analysis process. For instance, if the thumbnails are analyzed by a device other than the lifelog camera 10, then efficiencies are realized in the reduced amount of data that is processed during the analysis and in speeding transfer of the thumbnails to the device conducting the processing. Thereafter, results of the analysis may be applied to the high-resolution images to reduce an amount of data related to the collection of images in the lifelog camera 10, including one or more of reducing the number of high-resolution images to retain, reducing the number of high-resolution images to transfer to an external memory and/or compressing high-resolution images together.

Figure 2:
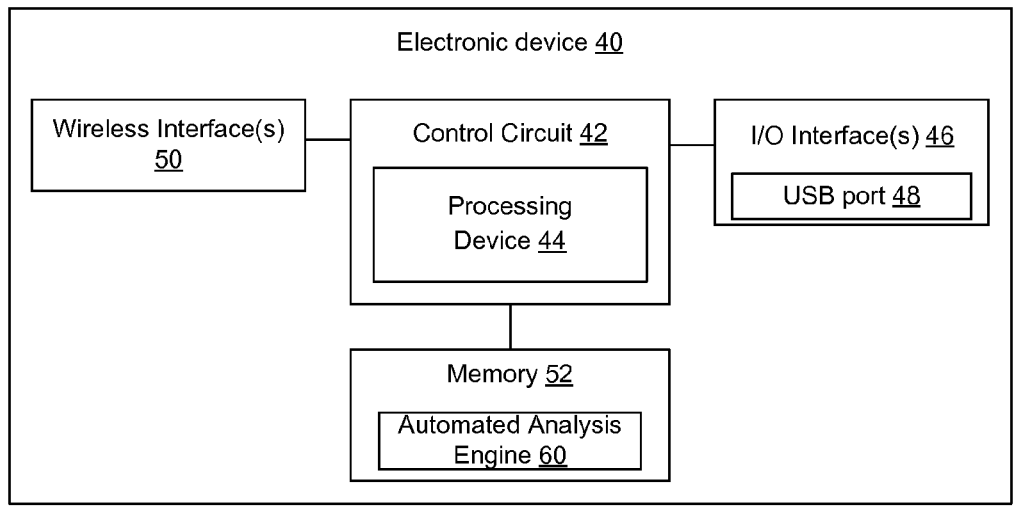
FIG. 2 is a schematic block diagram of an electronic device that communicates with the lifelog camera.
Figure 3:
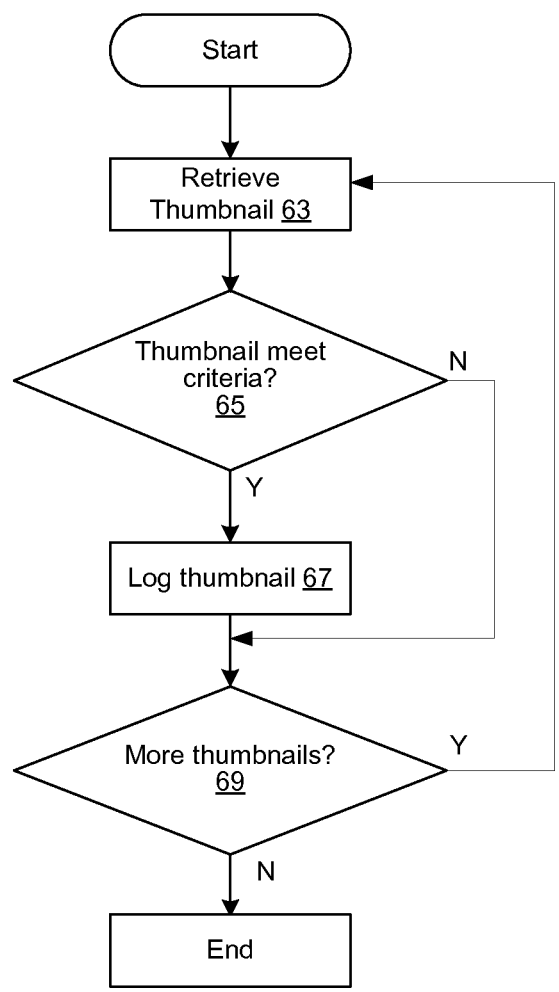
FIG. 3 is a flow diagram of steps carried out by an automated analysis engine.

With reference to FIG. 3, illustrated is a flow diagram representing steps that may be carried out by an automated analysis engine 60 (FIG. 2). Although illustrated in a logical progression, the illustrated blocks may be carried out in other orders and/or with concurrence between two or more blocks. Therefore, the illustrated flow diagram may be altered (including omitting steps or adding steps) and/or may be implemented in an object-oriented manner or in a state-oriented manner.

The logical flow may start in block 63. In block 63 a thumbnail may be retrieved from the available thumbnails. After a thumbnail has been retrieved, the flow may pass to block 65, where the thumbnail is analyzed to determine if it meets predetermined criteria (e.g., criteria indicating desirability to retain the image or transfer the image to external memory such as the memory of an electronic device separate from the lifelog camera 10). In one embodiment, the analysis engine may be configured to determine image interestingness based on criterion, including, but not limited to, the presence of certain objects such as faces, bodies, or predetermined object types or structure types in the thumbnail version of the captured image. The analysis engine 60 may have the ability to recognize often-recorded faces, and such recognized faces may be included in the criterion. Still another criteria may be how well a main object of the thumbnail image is centered in relation to the frame of the image (e.g., as a measure of camera angle). Another criteria may be a high image quality based on one or more factors including contrast, color balance, blur, focus, depth of field, or other factors. Yet another criteria may be based on the physical location of the camera at the time that the image was captured, certain locations being included or excluded. In one embodiment, input from the user may be received to enable or disable one or more of the criterion.

In another embodiment, block 63 may retrieve and block 65 may analyze more than one thumbnail at a time. In this embodiment, detectable differences, such as gross scale changes in thumbnails taken in close chronological proximity to each other may be employed to indicate interestingness. For instance, large changes in color or objects in a thumbnail image (e.g., as determined by comparing saliency maps of the thumbnail images) may be used as an indication that the scenery around the user has changed and the corresponding high-resolution image may be of interest for future viewing. As another example, a thumbnail image that is determined to contain a predetermined level of redundancy compared to a thumbnail of an earlier captured or later captured image may be flagged as uninteresting.

If a positive determination is made in block 65, the logical flow may proceed to block 67. In block 67, the identity of the thumbnail is logged or recorded in such a way that it will be accessible for later operations. In one embodiment, the logged identity is the filename of the thumbnail. In another embodiment, the identity is a unique identifier retrieved from the metadata of the thumbnail file. The identity of the thumbnail may be recorded in any suitable manner that will allow for its later retrieval (e.g. written to a file and persisted to non-volatile storage, written to a database, etc.).

If a negative determination is made in block 65, or after block 67 is complete, the logical flow may proceed to block 69. In block 69, the automated analysis engine determines if there are any thumbnails that have not been analyzed. If there is a positive determination, logical flow may be looped back to block 63. Alternatively, if there is a negative determination, then the process may end.

In one embodiment, the automated analysis engine 60 analyzes the thumbnails to identify subsets of thumbnails with a threshold level of similarity. The identities of thumbnails included in such subsets may then be used to package corresponding high-resolution images. Packaging high-resolution images may include compressing the images together, similar to the way frames of video are compressed together. However, in this case, the images are still images captured at spaced apart time intervals (e.g., 20 or more seconds apart) and/or one or more images from the chronological order of images may not be included in the compression (e.g., compressed together are images that are deemed interesting and these interesting images are spaced apart by one or more images deemed to be uninteresting and not included in the compression).

In one embodiment, the threshold level of similarity is a predetermined amount of similar data between or among two or more images. Alternatively, the threshold level of similarity is defined by the meeting of co-compressibility criterion, such as being capable of being compressed using a known video compression technique adapted to the still images in the subset. Once these subsets are identified, the automated analysis engine may record the identity of thumbnails included in the respective subsets. These identities, each corresponding to a captured high-resolution image, may then be used to package the high-resolution images according to similarity. In one embodiment, the imaging engine 22 identifies duplicated data in a set of high-resolution images that corresponds to a set of thumbnail identities identified as being similar, and negotiates the transfer of duplicated data such that it is transferred only once. For example, the packaging may include compressing the high-resolution images using one image as an Iframe and another image as a Pframe or a Bframe relative to the Iframe.

While it is contemplated that each of these analyses may be performed distinctly, in an exemplary embodiment, both would be performed. The automated analysis engine would analyze the thumbnails once for interestingness and once for similarity. Further, in an exemplary environment, the thumbnails would first be analyzed for interestingness, and then, only the group identified as interesting by this first analysis would be analyzed for similarity. In this way, uninteresting thumbnails are not analyzed for similarity and not included in any group that may later be packaged and transferred.

While the automated analysis engine may operate locally on the lifelog camera 10, it is contemplated that it may alternatively operate on a separate electronic device. Operation on another device reduces the needed processing power of the hardware used to implement the lifelog camera 10 and may reduce power consumption by the lifelog camera 10. In one embodiment, the lifelog camera 10 communicates with and transfers thumbnails to the other electronic device that executes the functions of the automated analysis engine 60.

Figure 4:
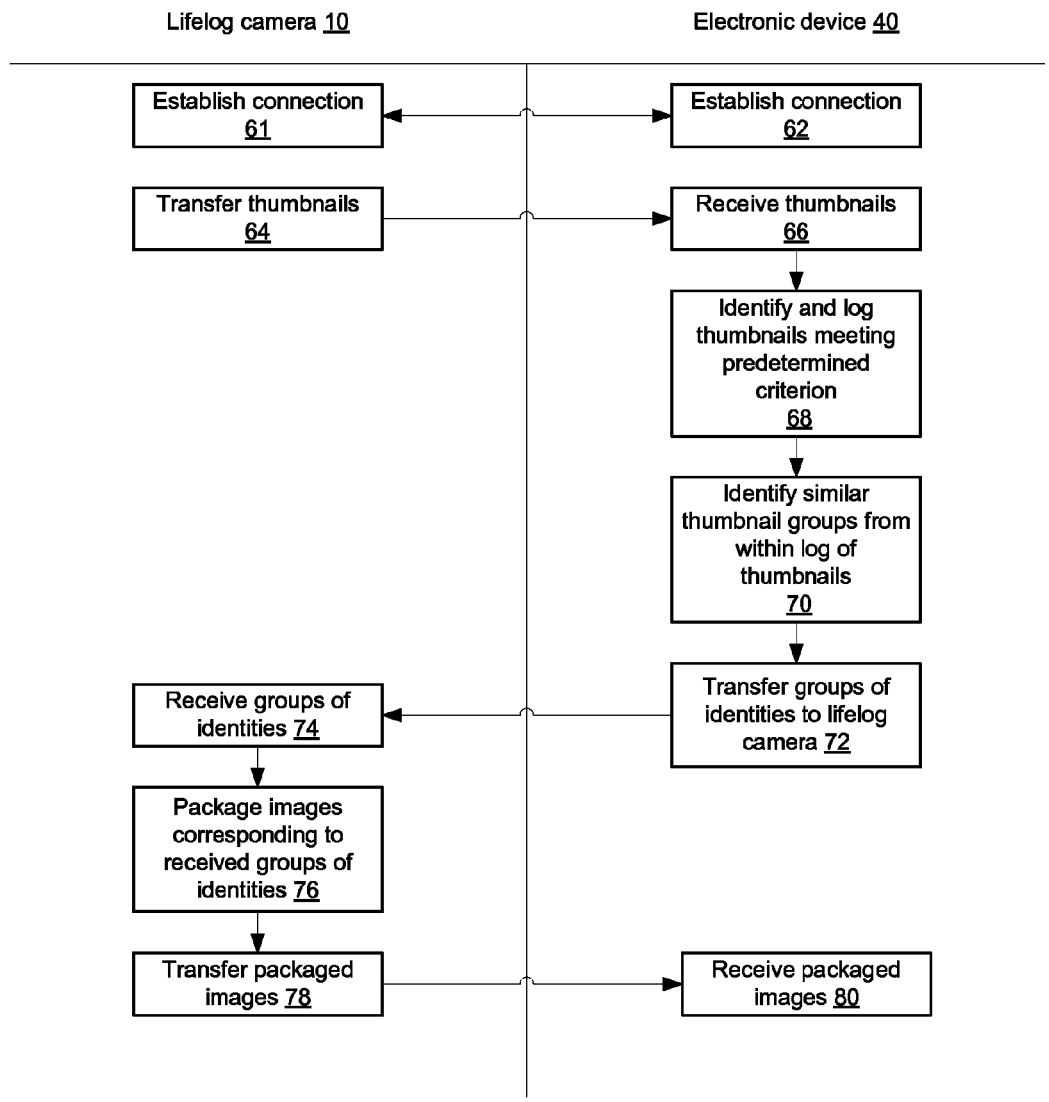
FIG. 4 is a flow diagram of functions carried out by the lifelog camera and the electronic device to analyze thumbnails and package images for transfer.

With additional reference to FIGS. 2 and 4, the lifelog camera 10 may communicate with a separate electronic device 40. FIG. 2 illustrates a schematic block diagram of an exemplary electronic device 40. In one embodiment, the electronic device 40 is a personal computer. In another embodiment, the electronic device 40 may be a server computer accessible through either a public computer network, such as the Internet, or through a private computer network. In still another embodiment, the electronic device 40 may be a portable electronic device such as, but not limited to, a mobile telephone, a tablet computing device, a gaming device, or a media player.

The electronic device 40 includes a control circuit 42 that is responsible for overall operation of the electronic device 40. In one embodiment, the control circuit 42 includes a processor 44 that executes operating instructions. The processor 44 of the control circuit 42 may be a central processing unit (CPU), a microcontroller, or a microprocessor that executes code in order to carry out operation of the electronic device 40.

In an exemplary embodiment, the electronic device 40 includes a memory 52. The memory 52 may be one or more of a buffer, a flash memory, a hard drive, a removable media, a volatile memory, a non-volatile memory, a random access memory (RAM), or other suitable device. In a typical arrangement, the memory 52 includes non-volatile memory for long-term data storage and volatile memory that functions as system memory for the control circuit 42. The memory 52 may exchange data with the control circuit 42 over a data bus. Accompanying control lines and an address bus between the memory 52 and the control circuit 42 also may be present. The memory 52 is considered a non-transitory computer readable medium.

The electronic device 40 may include interfaces for establishing communication with another device, such as the lifelog camera 10, another computer, a mobile phone, a wireless router for establishing Internet access, etc. An exemplary interface is an input/output (I/O) interface 46 in the form of an electrical connector and interface circuitry for establishing connectivity to another device using a cable. A typical I/O interface 46 is a USB port 48. Another exemplary interface is a wireless interface 50. The wireless interface 50 may be, for example, an interface that operates in accordance with Bluetooth standards, WiFi standards, or another wireless standard. Multiple wireless interfaces 50 may be present to operate over multiple standards (e.g., two or more of a BAN, Bluetooth and WiFi).

The lifelog camera 10 and the electronic device 40 may be configured to connect and communicate with each other through a common communication interface. In one embodiment the connection is established via a USB cable connected to the lifelog camera 10 and the electronic device 40 through respective USB ports 25 and 48. In an alternative embodiment, the lifelog camera 10 and the electronic device 40 are connected wirelessly via interfaces 26 and 50, respectively. In yet another embodiment, the lifelog camera 10 and the electronic device 40 are connected via a computer network through respective wired or wireless network adapters either wired or wireless. In one embodiment, the electronic device 40 is an internet server and is connect to the lifelog camera 10 via network adapters through the internet.

With additional reference to FIG. 4, illustrated is a flow diagram of functions carried out by the lifelog camera 10, and counterpart functions carried out by the electronic device 40 in an embodiment where the electronic device 40 processes the thumbnails. The flow diagram may be considered to represent steps of a method carried out by the lifelog camera 10 and a corresponding method carried out by the electronic device 40. Although the illustrated embodiment represents an exemplary embodiment of the logical flow of the respective methods, the order of the functional blocks of the illustrated embodiment may be altered and/or some blocks may be carried out concurrently. Additionally, some blocks may be omitted.

A connection is established between the lifelog camera 10 and the electronic device 40 two devices in blocks 61 and 62. The connection is carried out through one of the aforementioned mediums. In one embodiment, the electronic device 40 may recognize when there is a connection established with the lifelog camera 10 and prompt the lifelog camera 10 to transfer the generated thumbnails, thus initiating block 64. In another embodiment, the transfer of the thumbnails may be started manually or automatically by the lifelog camera 10, thus initiating block 64.

In block 64, the lifelog camera 10 transfers thumbnails to the electronic device 40. In block 66, the electronic device 40 receives the thumbnails transferred from the lifelog camera 10. As they are received, the thumbnails are stored in memory 52 of the electronic device 40.

In block 68, each thumbnail is analyzed to determine if the corresponding image should be retained, transferred to a memory external the lifelog camera 10 and/or further processed. In an exemplary embodiment, the analysis of block 68 is performed by the automated analysis engine 60 by carrying out the logical functions described and illustrated in connection with FIG. 3. This analysis may begin before all the thumbnails have been received in block 66, or may begin once block 66 has finished receiving the thumbnails. In one embodiment, the automated analysis engine 60 logs or otherwise records the results of the analysis. This recorded collection of thumbnails satisfying the criteria of block 64 may be used in later steps of the process.

In block 70, the thumbnails are analyzed for similarity. In an exemplary embodiment, the automated analysis engine 60 performs this analysis as described above. As noted above, in an exemplary embodiment, this analysis is only performed on thumbnails that met criteria to generate a positive determination in block 65 (FIG. 3). The automated analysis engine 60 may use the recorded collection of logged thumbnails from block 68 on which to perform the similarity analysis. In another embodiment, the automated analysis engine 60 may analyze all of the thumbnails received in block 66. In one embodiment, the automated analysis engine 60 generates groups of thumbnail identities based on thumbnails determined to be similar for packaging, the results of the similarity analysis being one or more or these subsets. The automated analysis engine 60 may log or otherwise record these groups and the thumbnail identities included in these groups.

In block 72, the electronic device 40 transfers the results of blocks 68 and 70 to the lifelog camera 10. In an exemplary embodiment, these results include the grouped identities of similar thumbnails produced by the automated analysis engine 60 and the identities of any logged thumbnails that did not become grouped for packaging in block 70. In another embodiment, the data transferred in block 72 includes the identities of the thumbnails that were logged in block 68, regardless of grouping performed in block 70. In another embodiment, the data transferred in block 72 includes the identities of the thumbnails that were logged in block 68, regardless of grouping performed in block 70, and the subsets of thumbnail identities identified in block 70. These results may be transferred during the same connection session by which the thumbnails were transferred to the electronic device 40, or they may be transferred during a subsequent connection session. In block 74, the lifelog camera 10 receives the results transmitted in block 72.

The logical flow may then pass to block 76. In block 76, the lifelog camera 10 packages the identified groups of high-resolution images. In an exemplary embodiment, the lifelog camera 10 forms groups of high-resolution images that correspond to the groups of thumbnail identities received from the image processing-device 40 in block 74. The lifelog camera 10 may then process each group of images to compress the images in the group using one image as an Iframe and other images in the group as one or more Pframes and/or one or more Bframes relative to the Iframe.

Then, in block 78, the packaged high-resolution images and any other unpackaged images are transferred from of the lifelog camera 10 to an external memory. Following transfer, and possible confirmation thereof, the collection of images and the corresponding thumbnails may be deleted from memory of the lifelog camera 10. In one embodiment the images are transferred to the electronic device 40 or another target electronic device. The images are received in block 80 and, if appropriate, decompressed or unpackaged. In one embodiment the transferred images are stored in memory of the receiving electronic device for later viewing by a user and/or further post-processing.

Although certain embodiments have been shown and described, it is understood that equivalents and modifications falling within the scope of the appended claims will occur to others who are skilled in the art upon the reading and understanding of this specification.

What is claimed is:

1. A lifelog camera that processes a collection of still images for efficient transfer to an external memory, comprising:
   a camera module that captures still images according to an image capture routine of the lifelog camera;
   a memory in which the captured images are stored; and
   a control circuit configured to:
      generate a thumbnail image for each stored image, each thumbnail image stored in the memory at a resolution less than a resolution of the corresponding image;
      analyze the thumbnail images to identify one or more thumbnail images that meet transfer criteria for transfer of one or more of the captured images to the external memory, the external memory being remote from the lifelog camera, said analysis comprising i) determining which of the thumbnail images satisfy at least one transfer criterion, and ii) comparing only the thumbnail images that satisfy the at least one transfer criterion to determine a level of similarity between the thumbnail images that satisfy the at least one transfer criterion; and
      tag for transfer to the external memory the images that correspond to the thumbnail images that satisfy the at least one transfer criterion and meet a threshold level of similarity.

2. The lifelog camera of claim 1, wherein the at least one transfer criterion includes one or more of:
   the thumbnail image contains a face;
   the thumbnail image having gross-scale changes in image content relative to a thumbnail image for an image captured prior in time; and
   the thumbnail image not redundant of thumbnail images for images captured prior in time.

3. The lifelog camera of claim 1, wherein following the transfer of the tagged images the control circuit controls the lifelog camera to delete the stored images and each corresponding thumbnail image from the memory that correspond to the tagged images.

4. The lifelog camera of claim 1, wherein the external memory is part of another electronic device.

5. The lifelog camera of claim 1, wherein
   the control circuit compresses the tagged images prior to transferring.

6. The lifelog camera of claim 5, wherein, relative to an order in which the collection of images was captured, the tagged images are separated in capture time by at least one other image from the collection.

7. The lifelog camera of claim 6, wherein control circuit compresses the tagged images using an image of the tagged images as an Iframe and another image of the tagged images as a Pframe or a Bframe relative to the Iframe.

8. A method of processing data related to a collection of images captured with a lifelog camera, comprising:
   receiving by an electronic device remote from the lifelog camera a thumbnail image for each image in the collection of images without receiving the collection of images, each thumbnail image having a resolution lower than a resolution of the corresponding image;
   analyzing by the electronic device the thumbnail images in an automated analysis engine to identify a subset of the thumbnail images that meet criteria for preservation of the corresponding images with higher resolution, said analysis comprising i) determining which of the thumbnail images satisfy at least one transfer criterion, ii) comparing only the thumbnail images that satisfy the at least one transfer criterion to determine a level of similarity between the thumbnail images that satisfy the at least one transfer criterion and iii) identifying the subset of thumbnail images as those that satisfy the at least one transfer criterion and meet a threshold level of similarity; and
   transmitting, by the electronic device to the lifelog camera, identities of the images that correspond to the thumbnail images in the subset.

9. The method of claim 8, wherein the at least one transfer criterion is established to identify thumbnail images that correspond to images with visual interestingness, thumbnail images with visual interestingness included in the subset.

10. The method of claim 9, wherein the method further comprises compressinq the subset of images with one another for transferring to a memory external the lifelog camera, and the transmitting including identifying the images that are in the group.

11. The method of claim 9, wherein the at least one transfer criterion includes one or more of:
   less than a threshold angle between a main object in the thumbnail image and an optical axis of a camera module of the lifelog camera at a time that the corresponding image was captured;
   high image quality as defined by one or more of contrast, color balance, blur, focus, and depth of field;
   location of the lifelog camera at the time that the corresponding image was captured;
   presence of a face in the thumbnail image;
   presence of a recognized face in the thumbnail image; and
   presence of a predicted object type in the thumbnail image.

12. The method of claim 8, wherein the at least one transfer criterion is established to identify thumbnail images having gross-scale changes in image content relative to thumbnail images for images captured prior in time, thumbnail images having the gross-scale changes included in the subset.

13. The method of claim 8, wherein the at least one transfer criterion is established to identify thumbnail images having redundancy with thumbnail images for images captured prior in time, thumbnail images having redundancy excluded from the subset.

14. The method of claim 8, further comprising identifying thumbnail images in the subset corresponding to images that are compressible with one another using one image as an Iframe and another image as a Pframe or a Bframe relative to the Iframe, the transmitting including identifying the images that are compressible with one another.

* * * * *